United States Patent Office 2,997,370
Patented Aug. 22, 1961

2,997,370
METHODS OF MANUFACTURING BORON TRICHLORIDE
Meherwam C. Irani, Pittsburgh, Pa., assignor, by mesne assignments, to Metal Chlorides Corporation, Carnegie, Pa., a corporation of New York
No Drawing. Filed Aug. 10, 1956, Ser. No. 603,210
7 Claims. (Cl. 23—205)

This invention relates to the manufacture of boron trichloride and particularly to the manufacture of boron trichloride from naturally occurring boron salts, such as the mineral colemanite.

Boron trichloride has heretofore been manufactured by the steps of converting boron salts to boron carbides, usually by converting boron salts to boron oxides and then reacting the boron oxides with carbon to form a sintered boron carbide mass or, alternatively, by reacting boron trioxide and carbon at high temperature to form boron carbide. The boron carbide mass is then reacted with chlorine to form boron trichloride. This is a very expensive method of producing boron trichloride. Attempts to chlorinate boron oxide in the presence of carbon have been unsuccessful. As a result, the only satisfactory and commercially feasible method of producing boron trichloride has been by chlorinating boron carbide. There has accordingly been a great need for a method of converting naturally occurring boron salts to boron trichloride, without the multiplicity of intermediate steps which has characterized the methods heretofore used.

I have found that boron trichloride can be produced directly from naturally occurring borates providing the borates have a melting point of about 700° C. or higher or have been modified to have such a higher melting point. I have found that the ores containing calcium borate are particularly satisfactory. The process of my invention may be more completely understood by referring to examples of the process as applied to certain commonly occurring natural boron salts.

Example I

Calcium borate ($Ca_2B_6O_{11} \cdot 5H_2O$) commonly called colemanite is admixed with powdered carbon in excess of the stoichiometric amount required to combine with the oxygen in the calcium borate. The mixture is heated to above 500° C. and chlorine is passed through the mixture. The chlorine reacts with the mixture according to the following reaction:

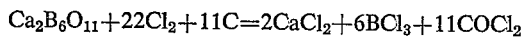
$$Ca_2B_6O_{11} + 22Cl_2 + 11C = 2CaCl_2 + 6BCl_3 + 11COCl_2$$

The boron trichloride ($BCl_3$) may be purified of calcium chloride ($CaCl_2$) and phosgene ($COCl_2$) by reacting with hydrogen gas to form HCl and CO which are separated by distillation. Alternatively, the gaseous products of this reaction, consisting of $BCl_3$ and $COCl_2$ may be passed successively through one or more beds of anhydrous calcium borate at elevated temperature and reacted according to the following formula:

$$2Ca_2B_6O_{11} + 6BCl_3 + 11COCl_2 = 2CaCl_2 + 12BCl_3 + 11CO_2$$

Example II

A mixed calcium sodium borate ($NaCaB_5O_9 \cdot 8H_2O$) commercially called Gerstley Borate, a mixture of colemanite and ulexite, is treated in the same fashion to produce boron trichloride as follows:

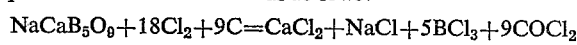
$$NaCaB_5O_9 + 18Cl_2 + 9C = CaCl_2 + NaCl + 5BCl_3 + 9COCl_2$$

The products of this reaction may be treated in exactly the same fashion as in the case of Example I to produce purified boron trichloride.

While I have described certain presently preferred practices of my invention, it will be understood that this invention may be otherwise practiced within the scope of the following claims.

I claim:
1. The method of manufacturing boron trichloride, comprising the steps of admixing a boron containing ore having a melting point above about 700° C. with carbon, heating the mixture to a temperature of above about 500° C. but below the melting point of the boron ore, passing chlorine gas through the bed of the heated ore and recovering the volatile products resulting from the reaction, reacting the volatile products with hydrogen and recovering the boron trichloride by distillation.

2. The method of manufacturing boron trichloride, comprising the steps of admixing a boron containing ore having a melting point above about 700° C. with carbon, heating the mixture to a temperature above about 500° C. but below the melting point of the ore, passing chlorine gas through the bed of heated ore while maintaining the temperature of the ore above about 500° C. but below the melting point of the ore and recovering the volatile products resulting from the reaction, reacting the volatile products with hydrogen and recovering the boron trichloride by distillation.

3. The method of manufacturing boron trichloride, comprising the steps of admixing calcium borate with carbon, heating the mixture to a temperature above about 700° C. but below the melting point of the borate, passing chlorine gas through the bed of heated ore and recovering the products resulting from the reaction, reacting the volatile products with hydrogen and recovering the boron trichloride by distillation.

4. The method of manufacturing boron trichloride, comprising the steps of admixing a borate from the group consisting of alkaline earth and alkali metal borates and mixtures thereof having a melting point above about 700° C. with carbon, heating the mixture to a temperature above about 700° C. but below the melting point of the borate, passing chlorine gas through the bed of heated borate and recovering the resulting products, reacting the volatile products with hydrogen and recovering the boron trichloride by distillation.

5. The method of manufacturing boron trichloride consisting essentially of the successive steps of mixing a boron containing ore having a melting point above about 700° C. with carbon, heating the mixture to a temperature above about 700° C. but below the melting point of the boron ore, passing chlorine gas through the bed of heated ore, recovering the volatile products resulting from the reaction, successively passing said volatile products through one additional bed of boron ore, heated to a temperature above about 700° C. but below the melting point of the ore, and recovering the resulting boron trichloride by distillation of the volatile products derived from the additional bed of ore.

6. The method of manufacturing boron trichloride consisting essentially of the steps of mixing calcium borate with carbon, heating the mixture to a temperature above about 700° C. but below the melting point of the calcium borate, passing chlorine gas through the bed or heated ore, recovering the volatile products resulting from the reaction, successively passing the volatile products through at least one additional bed of calcium borate, heated to a temperature above about 700° C., but below the melting point of the calcium borate, and recovering the resulting boron trichloride by distillation of the volatile products derived from the additional bed of calcium borate.

7. The method of manufacturing boron trichloride consisting essentially of the steps, admixing a borate selected from the group consisting of alkaline earth and alkali metal borates and mixtures thereof having a melting point above about 700° C. with carbon, heating the mixture to a temperature above about 700° C. but below the melting point of the borate, passing chlorine gas through the heated borate, collecting the resulting volatile products, successively passing the volatile products through at least one additional bed of borate heated to a temperature above about 700° C. but below the melting point of the borate, and recovering the resulting boron trichloride by distillation of the volatile products derived from the additional bed of borate.

References Cited in the file of this patent

UNITED STATES PATENTS

| | | |
|---|---|---|
| 1,259,719 | Blumenberg | Mar. 19, 1918 |
| 1,858,413 | Noack | May 17, 1932 |
| 2,097,482 | Weber | Nov. 2, 1937 |
| 2,131,793 | Cramer et al. | Oct. 4, 1938 |
| 2,369,214 | Cooper | Feb. 13, 1945 |
| 2,876,076 | Montgomery et al. | Mar. 3, 1959 |

FOREIGN PATENTS

| | | |
|---|---|---|
| 874,442 | France | Aug. 6, 1942 |

OTHER REFERENCES

Annales de Chimie et Physique, 9th Series, vol. 16, 1921, pages 6 and 7.

Mellor: "Comprehensive Treatise on Inorganic and Theoretical Chemistry," vol. 5, 1924, pages 966–967.